Aug. 30, 1960         G. C. CHAPMAN         2,950,569
METHOD AND APPARATUS FOR FORMING PROJECTIONS ON GLASS SURFACES
Filed Jan. 15, 1959                      4 Sheets-Sheet 1

INVENTOR.
GEORGE C. CHAPMAN
BY W. A. Schaich

ATTORNEYS

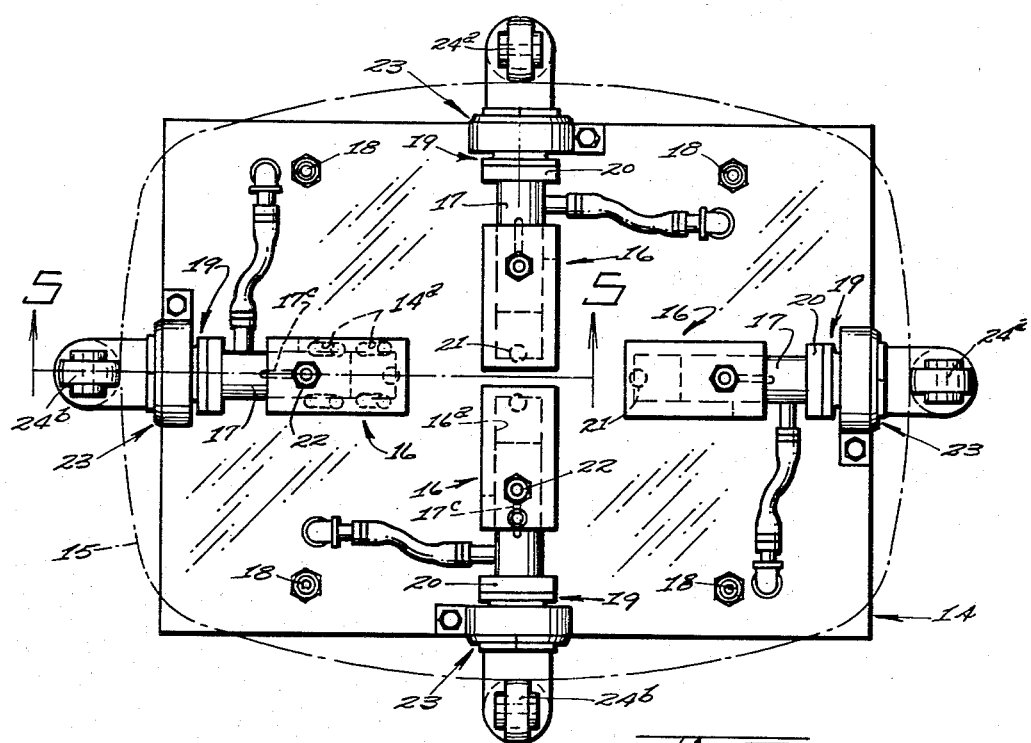
Fig. 2
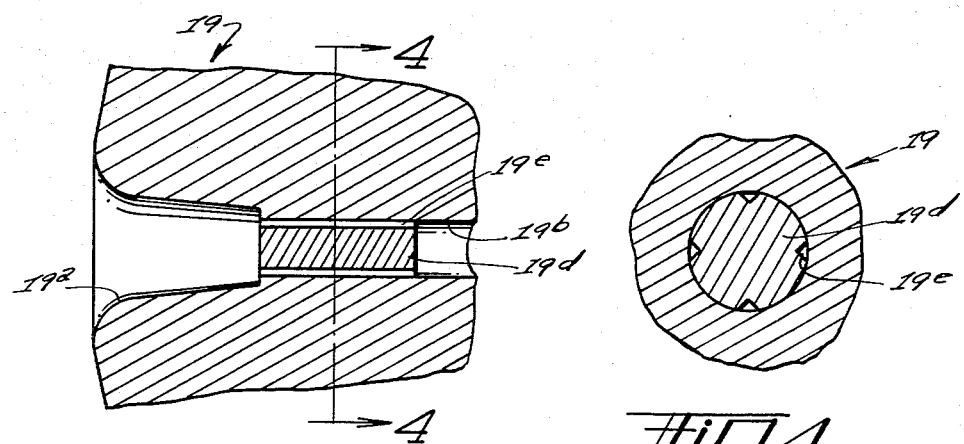
Fig. 3
Fig. 4
INVENTOR.
GEORGE C. CHAPMAN
BY W. A. Schaich
Leonard D. Joubier
ATTORNEYS INVENTOR.
GEORGE C. CHAPMAN
BY W. A. Dolaich
Leonard D. Dumbier
ATTORNEYS

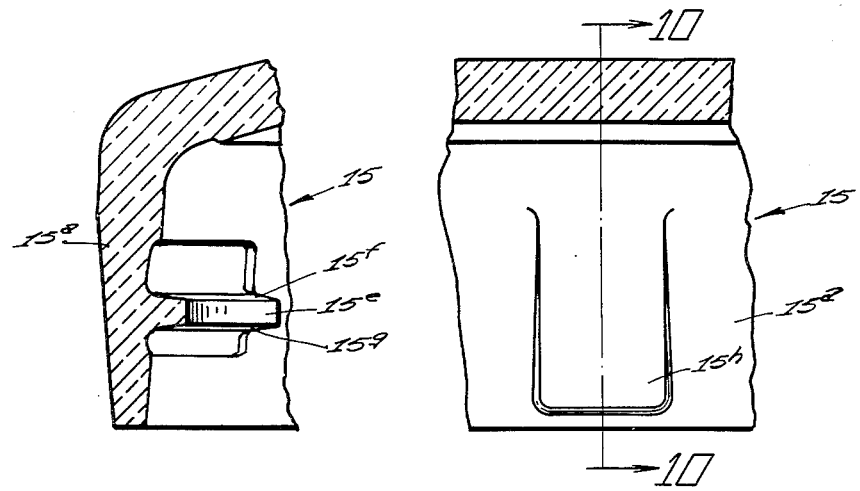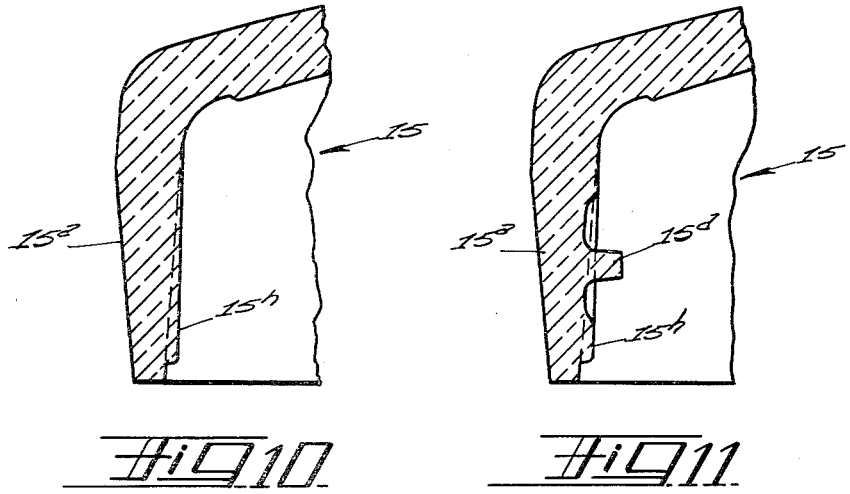

United States Patent Office 2,950,569
Patented Aug. 30, 1960

2,950,569

METHOD AND APPARATUS FOR FORMING PROJECTIONS ON GLASS SURFACES

George C. Chapman, Toledo, Ohio, assignor to Owens-Illinois Glass Company, a corporation of Ohio Filed Jan. 15, 1959, Ser. No. 787,083

12 Claims. (Cl. 49—7)

This invention relates to an improved method and apparatus for forming accurately located projections on the wall surfaces of a hollow glass member, and more particularly for forming color neck mounting projections on the interior walls of a glass face plate for a cathode ray tube.

This application is a continuation-in-part of my earlier filed application Serial No. 535,451, filed September 20, 1955, now abandoned.

As is well known, the recent advent of color television has created a demand for a cathode ray tube within which the so-called "color mask" may be accurately mounted with respect to the phosphor-bearing interior surface of the face plate. Since the face plate necessarily must be constructed of glass, the accurate mounting of such color mask has presented a difficult problem, in that resort has heretofore been made to sealing metal mounting lugs to the glass wall of the face plate. Such an operation is not only difficult and time-consuming, but the resulting glass-to-metal seals set up localized stresses in the face plate which often result in later breakage of the face plate and hence, the destruction of the cathode ray tube.

Accordingly, it is an object of this invention to provide an improved method and apparatus for integrally forming a mounting projection on the surface of a glass article such as a face plate for a cathode ray tube.

A particular object of this invention is to provide a method and apparatus for concurrently forming a plurality of integral projections on the interior surface of a glass face plate wherein the location of such projections with respect to the phosphor-bearing surface of the face plate and with respect to each other may be controlled with a high degree of accuracy.

The specific nature of this invention, as well as other objects and advantages thereof, will become apparent to those skilled in the art from the following detailed description, taken in conjunction with the annexed sheets of drawings on which, by way of preferred example only, is illustrated one embodiment of this invention.

On the drawings:

Figure 2 is a plan view of the machine of Figure 1, showing the locating and clamping means;

Figure 3 is a sectional view of a portion of the end of the shaping tool showing the manner of providing suction at this point;

Figure 4 is a sectional view taken at 4—4 of Figure 3 showing the vacuum groove structure;

Figures 8 to 11 are partial sectional views of a face plate illustrating some of the various shapes of projections possible with this method and apparatus.

Figure 1:
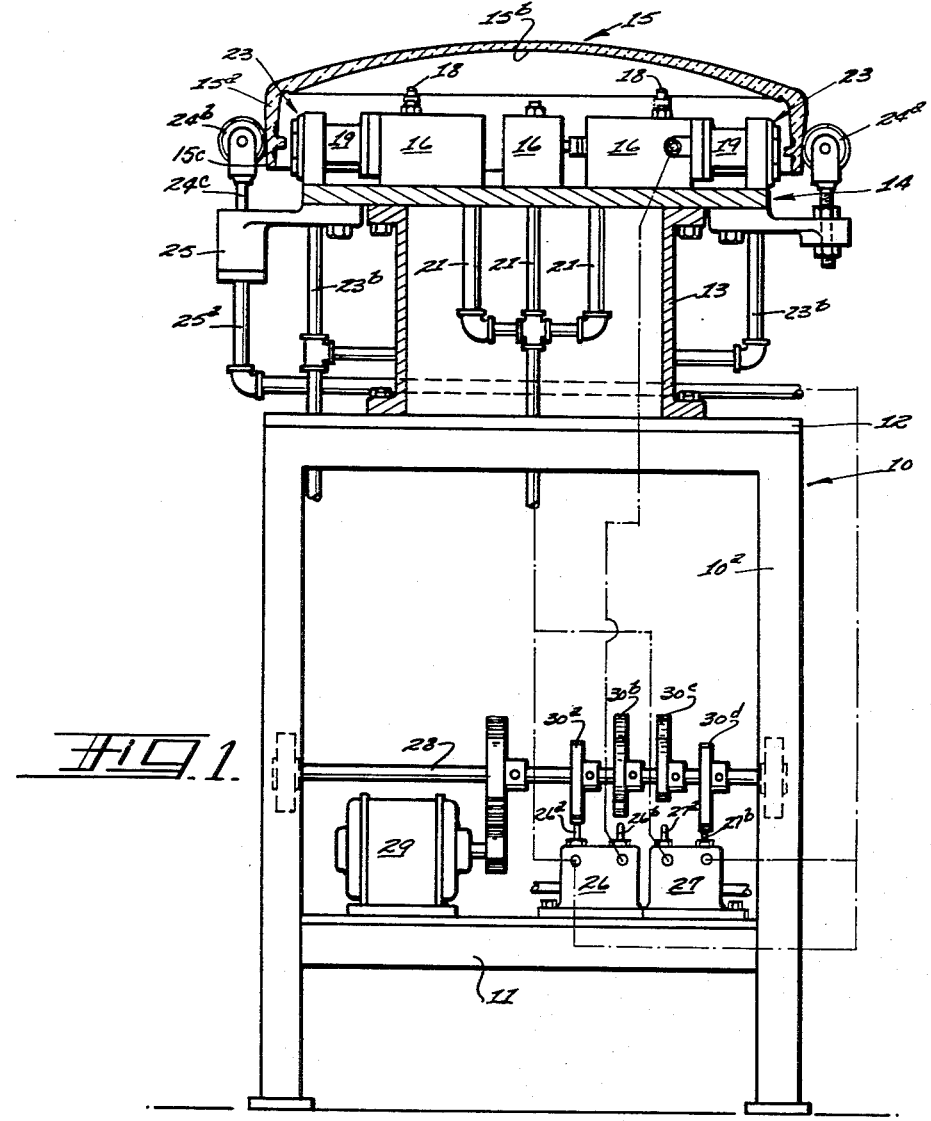
Figure 1 is a vertical elevational view, partly in section, of a machine embodying this invention, showing a face plate mounted in the machine subsequent to the projection forming operation.

The method contemplated in this invention may be briefly stated as follows. The surface area of the glass article at the point where it is desired to produce an integral projection, is locally heated. Such heating may be performed by a gas burner or by an electrical heating element in well-known fashion. The heating is continued to produce a softening of the glass in the localized area to a substantial depth into the wall of the glass article but insufficient to produce a softening of the entire cross-section of the wall. A shaping mandrel is then moved into engagement with the localized area of softened glass. Such shaping mandrel is provided with a shaping cavity in its glass-engaging end, and the softened glass is caused to flow into such cavity and to conform to the shape thereof through the pressure exerted by forcing the mandrel into the softened glass and by the application of a subatmospheric pressure to the shaping cavity. The mandrel is permitted to remain in position until the softened glass has solidified, and it is then withdrawn from contact with the glass, thus forming an integral projection on the glass surface, whose shape conforms to that of the shaping cavity of the mandrel.

Referring to the drawings, there is shown one form of apparatus capable of carrying out the above-described method. The apparatus comprises a table 10 having legs 10a which support a lower shelf 11. The top 12 of table 10 mounts a cylindrical drum-shaped support 13 upon which, in turn, is mounted a bed plate 14.

The machine embodying this invention will be described in the form utilized to produce integral projections upon the side wall flange 15a of a face plate 15 for a cathode ray tube, although it will be apparent to those skilled in the art that the principles of this invention may be equally applied to producing integral projections upon a glass article of any configuration.

In the application of this invention to glass face plates, a plurality of radially disposed mounting slots 14a are provided in the bed plate 14, which are respectively traversed by bolts 14b for adjustably positioning a plurality of cylinder housings 16 on such bed plate. Each cylinder housing 16 defines a bore 16a which receives a piston 17. Additionally, a plurality of locating buttons 18 are mounted on the bed plate 14 and adapted to contact the interior window surface 19b of successive face plates 15 and thereby vertically locate the successive face plates 15 with respect to the cylinder housings 16.

A shaping mandrel 19 is rigidly connected to the projecting end of each piston 17. The mandrel 19 defines a shaping cavity 19a, which is constructed to conform to the desired shape of the integral glass projections to be formed. A bore 19b extends axially through each mandrel 19 and connects with a similar bore 17a formed in piston 17 which in turn connects with a transverse bore 17b in piston 17. A gasket 20 is positioned between shaping mandrel 19 and piston 17 and assures a fluid-tight joint between the bore portions 19b and 17a.

A fluid conduit 16c is provided communicating with the inner end of the cylinder bore 16a. A pipe 21 connects with fluid conduit 16c and, as will be described, pipe 21 is alternately connected to a source of pressured fluid or subatmospheric fluid to produce the desired reciprocating movements of piston 17 relative to cylinder housing 16. To limit such reciprocating movement, the piston 17 is provided with an elongated keyway 17c, into which the squared end of a bolt 22 projects. Thus, by shifting the position of the cylinder housing 16 with respect to the bed plate 14, the extreme outer position of the shaping mandrel 19 may be adjustably determined.

Intermediate each cylinder housing 16 and flange wall 15a of the face plate 15 a heating element 23 is provided which may partake of any of several well known forms and is here illustrated as comprising an annular gas burner unit 23a, which is supplied with a suitable mixture of fuel and air through a pipe 23b. Heating element 23 is fixedly secured to bed plate 14 in a suitable fashion in coaxial relation to mandrel 19 and functions to heat a localized area of the glass flange 15a which is immediately aligned with the axial path of the shaping mandrel 19.

As previously mentioned, the vertical position of each face plate 15 is determined by the locating buttons 18. To horizontally position the side wall or flange 15a of the face plate 15 with respect to the shaping mandrels 19, a plurality of pairs of opposed roller clamping units are preferably utilized. One unit 24a of each opposed pair is fixedly mounted relative to the bed plate 14 in the manner illustrated in Figure 1, while the other unit 24b has a mounting shaft 24c which projects into a fixed cylinder housing 25 and has a piston element 24d mounted thereon. A pipe 25a connects cylinder housing 25 alternately with a source of pressured fluid or vacuum so that the vertical position of positioning roller 24b may be conveniently adjusted. In view of the fact that the external wall surface of each face plate 15 is slightly tapered, as indicated at 15c, it is apparent that when a face plate is inserted between the opposed pairs of positioning rollers and fluid pressure is applied to the cylinder 25 of each adjustable roller 24b through pipe 25a, the adjustable rollers will move upwardly along the tapered exterior surface 15c to effect a rigid clamping engagement with the face plate 15 and accordingly, an exact positioning of each successive face plate 15 with respect to the stationary rollers 24a. This type of clamping mechanism is described in more detail and claimed in the copending application of Leonard D. Soubier, Serial No. 535,403, filed September 20, 1955, assigned to the assignee of this application and which issued as Patent Number 2,826,870, March 18, 1958.

Figures 1A, 1B:
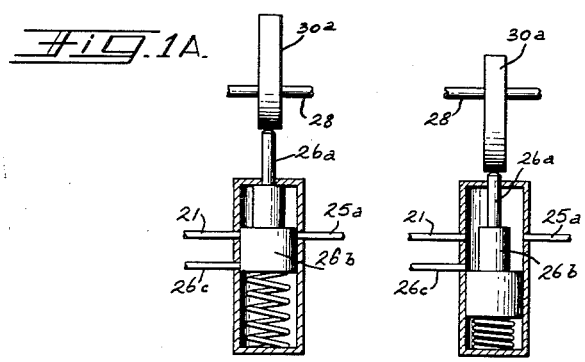
Figures 1A and 1B illustrate the operation of a valve forming a portion of the machine.

As was previously mentioned, each of the pipes 21 is alternately connected to a source of fluid pressure or subatmospheric pressure to control the axial reciprocating movement of the piston 17 and hence of the connected mandrels 19. In like manner the adjustable roller units 24b may be raised and lowered by alternately supplying fluid pressure or a vacuum to pipes 25a. Referring to Figure 1, a suitable mechanism for effecting such connections of the pipes 21 is schematically illustrated as comprising a dual valve unit 26 connected to a suitable vacuum source and having a pair of operating plungers 26a and 26b and a dual valve unit 27 connected to a suitable source of fluid pressure and having operating plungers 27a and 27b. As is schematically shown, fluid connections are provided between each of the pipes 21 and the valve controlled by plunger 26a and the valve controlled by plunger 27a. The valve 26b is illustrated in detail in Figures 1A and 1B and it will be seen that this normally prevents communication between the vacuum line 26c and the lines 21 and 25a. Upon actuation of the valve 26b, both these lines are connected to the vacuum line 26c to retract both the pistons 17 and 24d, thereby releasing the article 15. A cam shaft 28 is journaled in the frame 10 and is driven by a motor 29. Cams 30a, 30b, 30c and 30d are mounted along shaft 28 to respectively control the valve operating plungers 26a, 26b, 27a and 27b. Thus, by suitable proportioning of the cams 30a and 30c, a fluid pressure or a fluid vacuum may be applied to each cylinder housing 16 to control the movements of its associated shaping mandrel 19. Cam 30b operates plunger 26b to control the application of subatmospheric fluid pressure to each shaping cavity 19a by a suitable connection to the transverse bore 17b provided in each piston 17. Lastly, the valve unit controlled by cam 30d and operating plunger 27b controls the application of fluid pressure to the movable positioning rollers 24b whereas vacuum is supplied thereto by the valve unit controlled by cam 30a.

Figure 5:
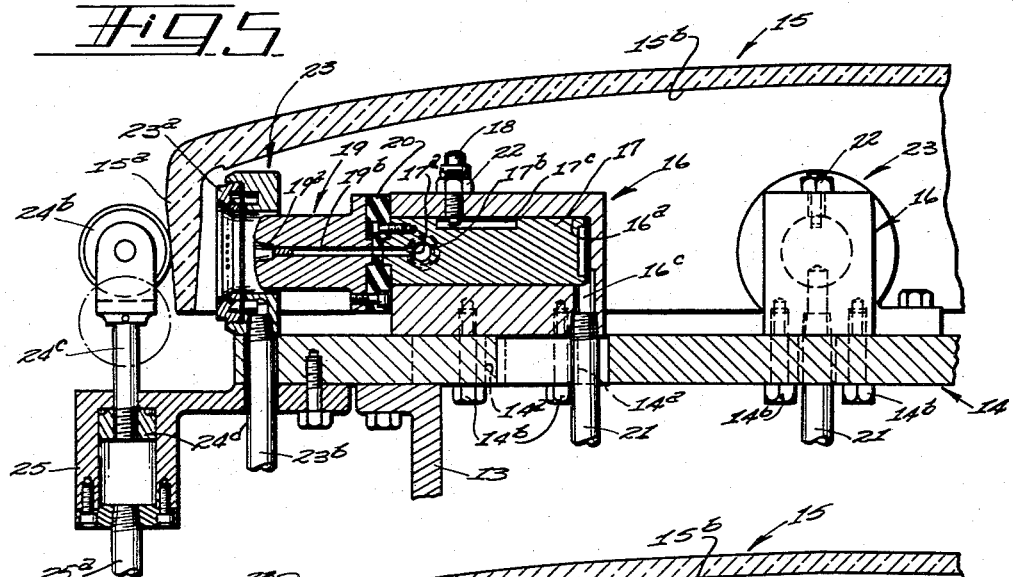
Figure 5 is a sectional view taken at 5—5 of Figure 2 and shows position of shaping tool during softening of glass surface.
Figure 6:
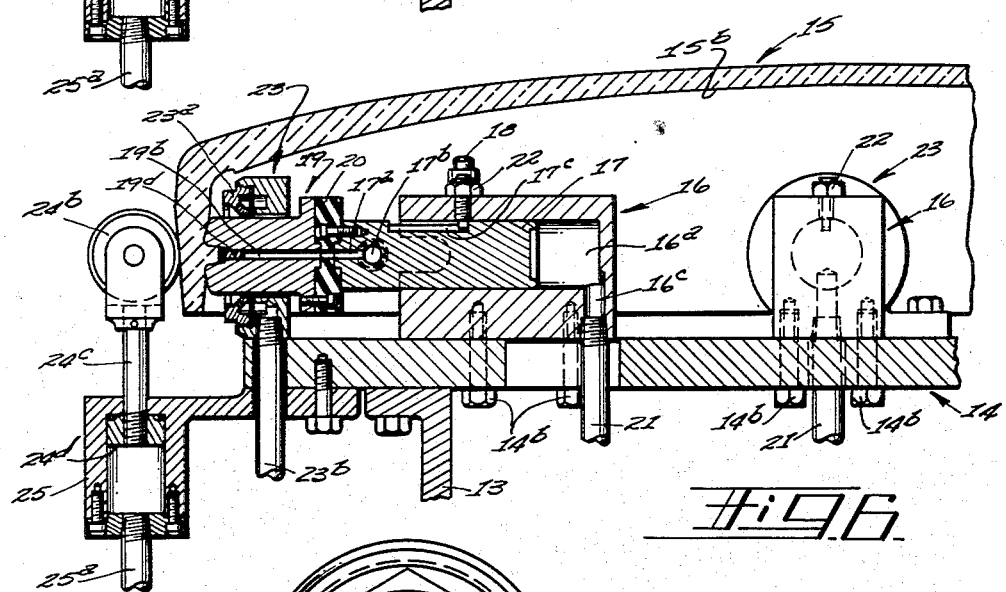
Figure 6 is also a sectional view at 5—5 of Figure 2, cut shows shaping tool in shaping position.
Figure 7:
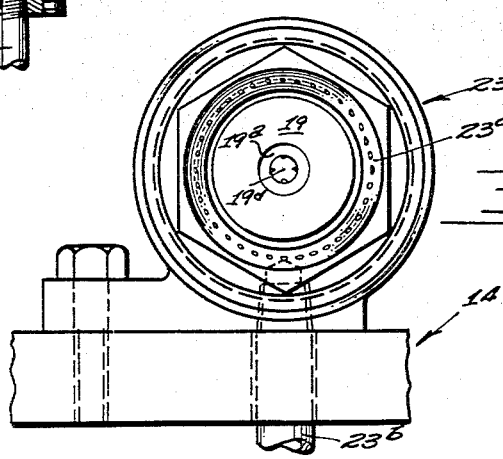
Figure 7 is an enlarged front view of the burner and shaping tool.

In the operation of the described apparatus, the operating cycle is initiated when the movable positioning rollers 24b are in their lowered position, indicated by the dotted line in Figure 5, and the pistons 17 are in their retarded positions. In this condition, a face plate 15 may be readily inserted in the apparatus, resting upon the positioning buttons 18. Shortly thereafter, the cam 30d actuates valve plunger 27b to supply pressure to the cylinders 25 associated with the movable positioning rollers 24b, and such rollers are moved to the position shown in Figure 5, in which the face plate 15 is firmly grasped and located relative to the cylinder housing 16. Concurrently, the heating element 23 is actuated, and intense heat is applied to a localized area of the side wall 15a of the face plate 15. This heating is carried on for a period sufficient to insure that an area of the side wall at least equal to the cross-sectional area of shaping mandrel 19 is softened, yet the heating is not sufficient to produce a softening of the glass throughout the entire wall thickness.

At this point, the control plunger 27a is actuated by the cam 30c to apply fluid pressure to the cylinder housing 16 through the pipes 21 and thus forcibly displace each piston 17 and its associated shaping mandrel 19 outwardly into engagement with the softened glass area. The annular configuration of heating element 23 permits this motion to take place without the necessity of completely interrupting the continued heating of the localized area. If the desired shape of the projection to be formed is of limited height, then the forcible engagement of the shaping cavity 19a with the molten glass may be sufficient to produce a displacement of the molten glass into such shaping cavity. Since as previously mentioned, the side wall flange 15a is not softened completely through its thickness, the residual unsoftened glass resists the pressure applied by the forcible engagement of the shaping tool, with the result that a portion of the softened glass is displaced in a direction opposite to that in which the pressure or force is applied by the shaping tool. Hence, the softened or molten glass is displaced into the shaping cavity as described. The flow of the glass will, of course, be facilitated if the walls of the cavity 19a are tapered so that the cavity decreases in cross-sectional area in its depth direction. For projections which are of substantial height, it is desirable to apply subatmospheric pressure to the shaping cavity 19a to assist the flow of the softened glass into such cavity. Such subatmospheric pressure is applied through the mandrel bore 19b, piston bore 17a and transverse piston bore 17b, and the application of the vacuum is controlled by the cam 30b and its cooperating valve plunger 26b. In order to permit such vacuum application without drawing the softened glass into the bore 19b, a plug 19d is press-fitted in the end of bore 19b adjacent to cavity 19a, and the surface of such plug is provided with restricted area slots 19e, which are illustrated in exaggerated form in Figures 3 and 4 but are only of sufficient size to permit the application of subatmospheric pressure to the interior of shaping cavity 19a.

The heaters 23 are then de-energized or reduced in their heating intensity so that solidification of the softened glass will promptly occur. The valve controlled by plunger 26a is then actuated by cam 30a to apply subatmospheric pressure to cylinder housing 16, and the piston 17 and the associated shaping mandrel 19 are withdrawn from engagement with the glass. Concurrently, fluid pressure is released from the cylinders 25 and vacuum applied to permit the movable positioning rollers 24b to assume their inoperable positions, and the face plate 15 with the projections formed thereon, as indicated in Figure 1, may be removed from the apparatus.

Referring to Figures 8 through 11, there are shown two alternative projection constructions which can be produced by the aforedescribed method and apparatus merely by appropriate modification of the shaping cavity in the case of the construction of Figure 8, or by modification of the wall section of the face plate in the case of the modification of Figures 9 through 11. In Figure 8, the shaping cavity employed on the mandrel 19 is of elongated rectangular configuration so as to produce a projection 15e which defines two opposed planar locating surfaces 15f and 15g substantially normal to the central axis of the face plate 15.

In the construction illustrated in Figures 9 through 11, the face plate 15 as originally formed in the conventional pressing operation, is provided with an inwardly projecting lug 15h providing a thickened area at least equal to that of the shaping mandrel 19. A conical projection 15d is then formed on such lug 15h in the same manner as heretofore described but the additional wall thickness provided by the lug 15h prevents any substantial reduction in wall thickness of the face plate side wall flange 15a.

It will, of course, be understood that various details of construction may be modified through a wide range without departing from the principles of this invention, and it is, therefore, not the purpose to limit the patent granted hereon otherwise than necessitated by the scope of the appended claims.

What is claimed is:

1. The method of forming a mounting projection on the interior wall of a glass face plate for a cathode ray tube which comprises the steps of locally heating an interior surface area of said interior wall to soften such area only to a depth substantially less than the wall thickness, forcing the end of a tubular mandrel into the central portion of said softened area to displace softened glass into the bore of said mandrel, and withdrawing the mandrel after solidification of the softened glass.

2. The method of forming a mounting projection in the interior wall of a glass face plate for a cathode ray tube which comprises the steps of locally heating an interior surface area of said interior wall to soften such area only to a depth substantially less than the wall thickness, forcing the end of a tubular mandrel into the central portion of said softened area to displace softened glass into the bore of said mandrel, applying vacuum to the bore of the mandrel to assist the movement of softened glass thereinto, and withdrawing the mandrel after solidification of the softened glass.

3. The method of forming a projection on a wall of a hard glass article which comprises the steps of heating a localized surface area of said wall to soften such area to a depth less than the wall thickness, bringing a shaping tool into pressure contact with said softened area, and shaping the softened glass.

4. The method of forming mounting projections on a wall of a hard glass article which comprises the steps of heating a plurality of limited surface areas spaced along said wall to soften each of such areas to a depth less than the wall thickness, bringing a shaping tool into pressure contact with each said softened area, and shaping the softened glass.

5. The method of forming projections on the interior wall of a hard glass article which comprises the steps of locally heating and softening a localized surface area along said interior wall to soften such area to a depth less than the wall thickness, bringing a shaping tool into pressure contact with said softened area, creating a subatmospheric pressure between the glass of said softened area and the end of said shaping tool and shaping the softened glass.

6. Apparatus for forming a plurality of accurately spaced projections on the interior surface of a glass face plate, comprising a bed plate, a plurality of tubular open end mandrels, means on said bed plate for respectively journaling said mandrels for axial reciprocal movements, means for securing successive face plates in a fixed position on said bed plate so that said mandrels are respectively axially movable into engagement with predetermined areas of the interior surface of said face plate, a plurality of means for locally heating said predetermined areas to soften the glass only to a depth substantially less than the glass thickness, and means for concurrently axially shifting said mandrels into forcible engagement with said softened glass areas, thereby displacing softened glass into the open end of said tubular mandrels.

7. The combination defined in claim 6, wherein the glass contacting end of said tubular mandrel defines a tapering bore surface decreasing in area inwardly from said glass contacting end.

8. Apparatus for forming a plurality of accurately spaced projections on the interior surface of a glass face plate, comprising a bed plate, a plurality of tubular open end mandrels, means on said bed plate for respectively journaling said mandrels for axial reciprocal movements, means for securing successive face plates in a fixed position on said bed plate so that said mandrels are respectively axially movable into engagement with predetermined areas of the interior surface of said face plate, a plurality of means for locally heating said predetermined areas to soften the glass only to a depth substantially less than the glass thickness, means for concurrently axially shifting said mandrels into forcible engagement with said softened glass areas, and means for concurrently producing a partial vacuum in the bore of said tubular mandrels, thereby displacing softened glass into the open end of said tubular mandrels.

9. Apparatus for forming a plurality of accurately spaced projections on the interior surface of a glass face plate, comprising a bed plate, a plurality of tubular open end mandrels, a piston coaxially joined to each mandrel, a plurality of fluid pressure cylinders respectively journaling said pistons for axial reciprocal movements, means for securing successive face plates in a fixed position on said bed plate so that said mandrels are respectively axially movable into engagement with predetermined areas of the interior surface of said face plate, a plurality of means for locally heating said predetermined areas to soften the glass only to a depth substantially less than the glass thickness, and means for concurrently actuating said cylinders to force said mandrels into respective engagement with said softened glass areas, thereby displacing softened glass into the bore of said mandrels.

10. Apparatus for forming a plurality of accurately spaced projections on the interior side wall surface areas of a hollow glass article, comprising a bed plate, a plurality of oppositely disposed mandrels thereon, shaping cavities formed in the outer end of each said mandrel, means on said bed plate for respectively journaling said mandrels for horizontal axial reciprocal movements, means for securing successive glass articles on said bed plate with said side walls in fixed position with respect to said axially movable mandrels, means for locally heating and softening spaced-apart areas on said side wall surface, means for simultaneously shifting said oppositely disposed mandrels axially away from each other and into said softened glass, means operable concurrently with said shifting to create a partial vacuum in the cavity portion of each said mandrel, and means to regulate the distance between the outer ends of said oppositely disposed mandrels.

11. The method of forming a mounting means on the wall of a glass face plate for cathode-ray tubes, which comprises the steps of heating a localized surface area of said wall to soften such area to a depth less than the wall thickness, forcing the end of a mandrel into said softened area to displace the softened glass into the shape provided by the end of said mandrel, and withdrawing the mandrel after the softened glass has reached self-supporting rigidity.

12. The method of forming a projection on the wall of a hard glass article, which comprises the steps of heating a localized area of said wall to soften such area to a depth less than the wall thickness, forcing a mandrel into pressure contact with said softened glass, said glass contacting portion of said mandrel defining a shaping cavity, and said pressure of said mandrel upon the softened glass being sufficient to displace a portion of the softened glass in a direction generally opposite that of the pressure applied to thereby force said softened glass into said shaping cavity.

References Cited in the file of this patent

UNITED STATES PATENTS

| | | |
|---|---|---|
| 1,963,008 | Weeks | June 12, 1934 |
| 2,102,357 | Dichter | Dec. 14, 1937 |
| 2,146,572 | Hahn et al. | Feb. 7, 1939 |
| 2,410,345 | Hinkley | Oct. 29, 1946 |
| 2,414,587 | Eisler | Jan. 21, 1947 |